(12) United States Patent
Konishi et al.

(10) Patent No.: US 8,741,034 B2
(45) Date of Patent: Jun. 3, 2014

(54) EXHAUST GAS TREATMENT SYSTEM WITH CARBON DIOXIDE CHEMICAL ABSORPTION EQUIPMENT

(75) Inventors: Tomoyuki Konishi, Kure (JP); Takanori Nakamoto, Kure (JP); Naoki Oda, Kure (JP); Nobuo Morimoto, Kure (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/641,786

(22) PCT Filed: Apr. 19, 2011

(86) PCT No.: PCT/JP2011/059597
§ 371 (c)(1),
(2), (4) Date: Nov. 7, 2012

(87) PCT Pub. No.: WO2011/132659
PCT Pub. Date: Oct. 27, 2011

(65) Prior Publication Data
US 2013/0052096 A1 Feb. 28, 2013

(30) Foreign Application Priority Data

Apr. 20, 2010 (JP) ................................ 2010-096844

(51) Int. Cl.
*B01D 53/14* (2006.01)
(52) U.S. Cl.
USPC .................. 96/242; 95/183; 95/193; 95/194; 95/209; 95/227; 95/236
(58) Field of Classification Search
CPC ................................................. B01D 2259/65
See application file for complete search history.

(56) References Cited

U.S. PATENT DOCUMENTS

| 8,016,919 B2* | 9/2011 | Iijima et al. ..................... 95/178 |
| 2010/0050637 A1* | 3/2010 | Yamashita et al. ............... 60/653 |

FOREIGN PATENT DOCUMENTS

| JP | 07-031834 | 2/1995 |
| JP | 2009-247932 | 10/2009 |

(Continued)

OTHER PUBLICATIONS

Translation of JP 2009247932.*

(Continued)

*Primary Examiner* — Duane Smith
*Assistant Examiner* — Phillip Shao
(74) *Attorney, Agent, or Firm* — Fay Sharpe LLP (57) ABSTRACT

An object of the present invention is to provide an exhaust gas treatment system that effectively use heat recovered from an exhaust gas without any limitation in a $CO_2$ chemical absorption equipment that requires enormous heat energy, and thus enabling reduction in running cost of the $CO_2$ chemical absorption equipment. Disclosed is an exhaust gas treatment system with a $CO_2$ chemical absorption equipment, which is provided with a heat recovery device that recovers exhaust heat from an exhaust gas discharged from a boiler; and a $CO_2$ chemical absorption equipment that absorbs $CO_2$ in the exhaust gas by bringing the exhaust gas into contact with an amine absorbing solution in a carbon dioxide ($CO_2$) absorption column, heats the absorbing solution that have absorbed $CO_2$ thereby releasing $CO_2$ into a $CO_2$ regeneration column, heats the absorbing solution after release of $CO_2$ via a reboiler, and then circulates the absorbing solution in a $CO_2$ absorption column; the exhaust gas treatment system comprising a heat exchange unit that applies heat recovered by the heat recovery device to the absorbing solution that is delivered to the reboiler from the $CO_2$ regeneration column of the $CO_2$ chemical absorption equipment.

9 Claims, 5 Drawing Sheets

(56) References Cited

FOREIGN PATENT DOCUMENTS

| | | | |
|---|---|---|---|
| JP | 2009247932 A | * | 10/2009 |
| JP | 2010-085078 | | 4/2010 |

OTHER PUBLICATIONS

International Search Report mailed Aug. 2, 2011 for International application No. PCT/JP2011/059597.

* cited by examiner

EXHAUST GAS TREATMENT SYSTEM WITH CARBON DIOXIDE CHEMICAL ABSORPTION EQUIPMENT

This application claims priority under 35 U.S.C. sect. 119(a) on Patent Application No. 2010-096844 filed in Japan on Apr. 20, 2010, the entire contents of all of which are hereby incorporated by reference.

TECHNICAL FIELD

The present invention relates to an exhaust gas treatment system with a carbon dioxide chemical absorption equipment, and particularly to an exhaust gas treatment system in which heat recovered from an exhaust gas is effectively used in a carbon dioxide ($CO_2$) chemical absorption equipment.

BACKGROUND ART

In general, since nitrogen oxide, sulfur oxide, soot dust, heavy metals and the like are contained in an exhaust gas discharged from a coal-fired boiler or the like, a smoke exhaust treatment device is disposed on a downstream side of the coal-fired boiler or the like. After removing a toxic substance in the exhaust gas, the thus obtained clean gas is released into the atmosphere.

Figure 4:
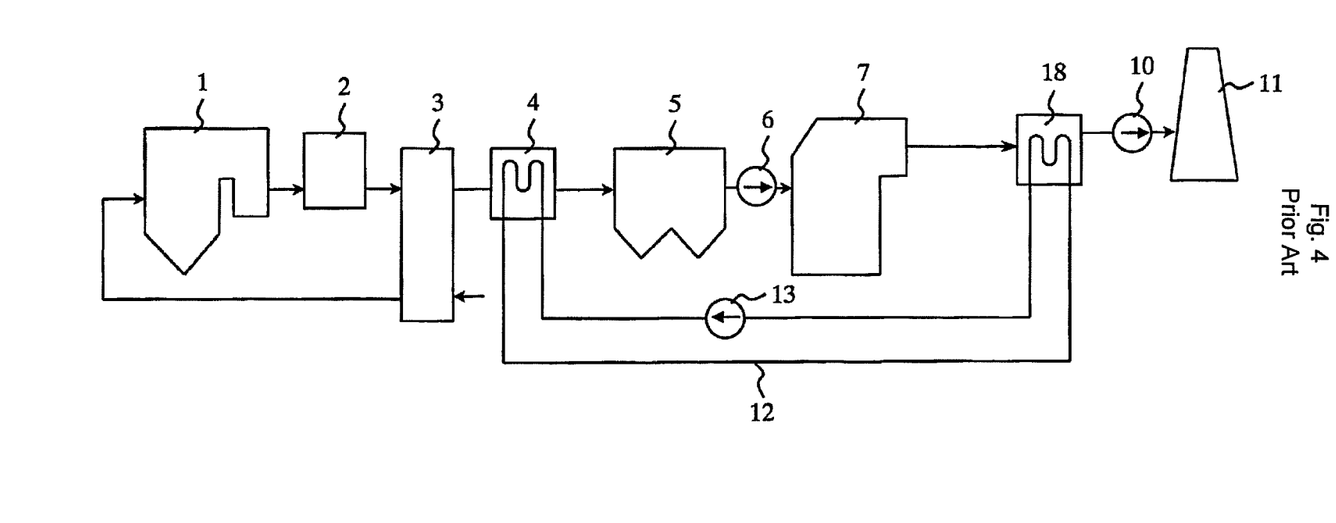
FIG. 4 is an explanatory drawing of a conventional exhaust gas treatment system.

FIG. 4 is an explanatory drawing showing an example of a conventional smoke exhaust treatment system. A combustion exhaust gas discharged from a boiler 1 is heat-exchanged by an air preheater 3 after removing nitrogen oxide by a denitration device 2, and then cooled to, for example, 120° C. to 170° C. Heat of the exhaust gas passed through the air preheater 3 is taken by a heating medium in a heat recovery device 4 and, after cooled to, for example, 75° C. to 110° C., smoke dust in the exhaust gas are removed by a precipitator 5. The pressure is further increased by an induced draft fan 6, and then sulfur oxide is removed by a wet-type desulfurization device 7. The temperature of the exhaust gas passed through the wet-type smoke exhaust desulfurization device usually decreases to about 40° C. to 60° C., resulting in a moisture saturation state. When the exhaust gas is released into the atmosphere as it is through a funnel to generate a white smoke, and thus the exhaust gas is heated to a dew point or higher by a reheater 18 and then discharged through the funnel 11 via a desulfurization fan 10. In this case, a heating medium circulation line 12 using a heat transfer tube is provided between the heat recovery device 4 and the reheater 18, and thus a heating medium is circulated between the heat recovery device 4 and the reheater 18 by a heating medium circulation pump 13 via the heat transfer tube. According to this system, the temperature of the exhaust gas is decreased by the heat recovery device 4 thereby allowing ash in the exhaust gas to adsorb $SO_3$ and heavy metals, and thus enabling the removal of them together with ash by the precipitator 5. It is also possible to use heat recovered by the heat recovery device 4 for reheating of a moisture saturated gas of an outlet of the wet-type desulfurization device 7, for the purpose of preventing the generation of a white smoke through the funnel 11 (Patent Document 1).

Figure 5:
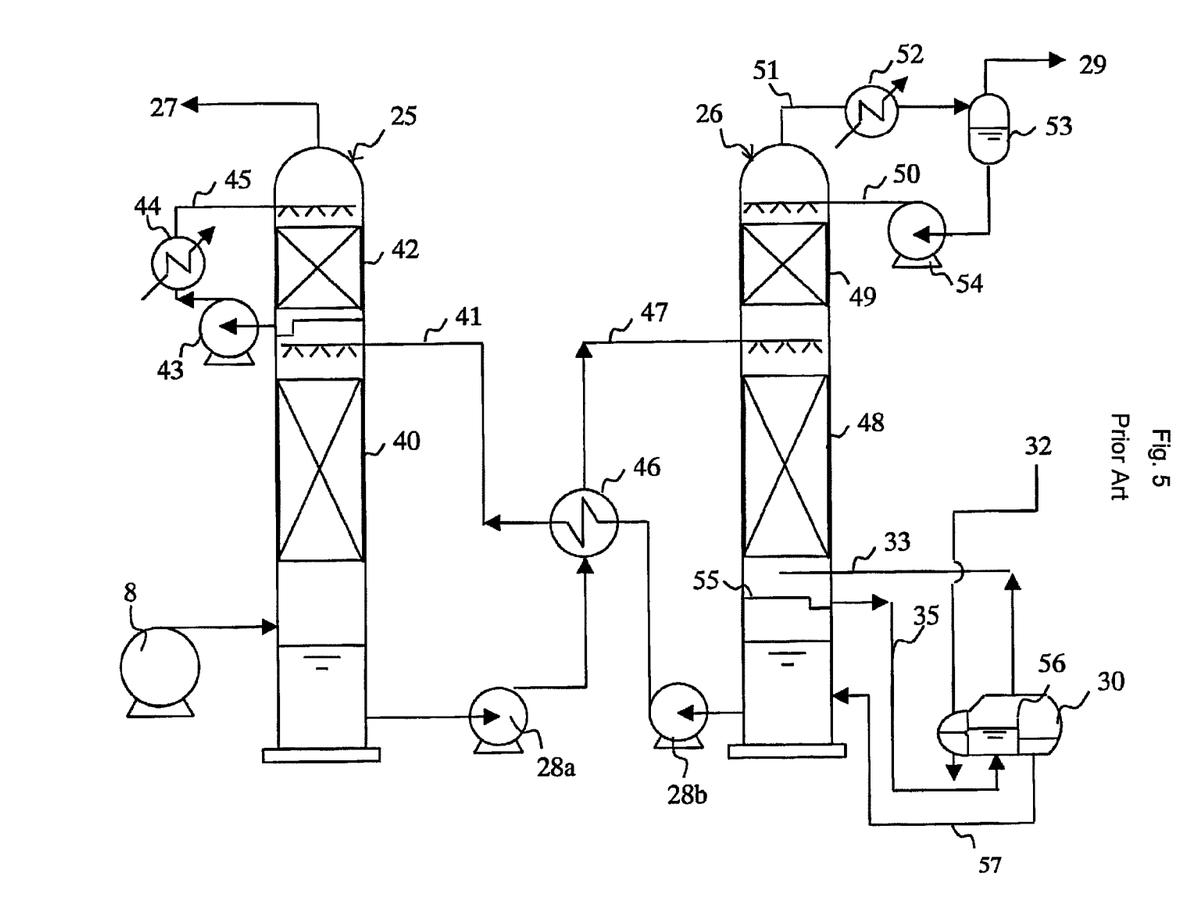
FIG. 5 is an explanatory drawing of a $CO_2$ chemical absorption equipment by a conventional amine absorbing solution.

For the purpose of reducing emissions of $CO_2$, it has recently been planned to provide a smoke exhaust treatment system with a $CO_2$ recovery equipment, and progress has been made in the research and development. There has been a proposition, as one of the $CO_2$ recovery equipment, of a $CO_2$ chemical absorption equipment in which $CO_2$ is recovered using an aqueous solution of an amine compound such as alkanolamine and the like as an absorbing solution (for example, Patent Document 2). FIG. 5 is an explanatory drawing showing an example of a conventional $CO_2$ chemical absorption equipment by an amine absorbing solution. The exhaust gas having a pressure raised by a blower 8 is introduced into the lower portion of an absorption column 25. After removing $CO_2$ by contact with the amine absorbing solution fed through the upper absorption column amine feed piping 41 in an absorption column packed bed 40, the exhaust gas is washed with wash water fed through a wash water circulation line 45 in an absorption column water washing portion 42 and, at the same time, mist of the absorbing solution accompanied with the gas is removed and the gas is discharged outside as a $CO_2$-removed gas 27. Wash water, that has flown down in the absorption column water washing portion 42, is extracted outside of the absorption column by an absorption column water washing pump 43, passed through a cooler 44 and then circulated to the absorption column through the wash water circulation line 45. On the other hand, the amine absorbing solution containing $CO_2$ absorbed therein is stored in the bottom portion of the absorption column 25, introduced into an amine heat exchanger 46 by an absorbing solution circulation pump 28a, heated, for example, from 40° C. to 100° C., and then introduced into a regeneration column 26 through a regeneration column amine feed piping 47. In the regeneration column 26, the $CO_2$-rich amine absorbing solution fed through the regeneration column amine feed piping 47 is fed to a regeneration column packed bed 48. On the other hand, vapor is fed to the lower portion of the packed bed 48 from a reboiler 30 through a regeneration column vapor feed piping 33. In the regeneration column packed bed 48, $CO_2$ is eliminated in a gas phase by vapor-liquid contact between the $CO_2$-rich amine absorbing solution and vapor. Mist of the amine absorbing solution accompanied with the eliminated $CO_2$ gas is removed in an upper regeneration column water washing portion 49. A regeneration column outlet gas 51 is cooled to 40° C. by a regeneration column cooler 52 and condensed water drains are separated by a drum 53, followed by feeding to the regeneration column 26 as washing water 50 of the regeneration column water washing portion by means of a regeneration column wash water pump 54. In contrast, a $CO_2$-lean absorbing solution, from which $CO_2$ has been eliminated, is once stored in a tray 55 of the regeneration column lower portion, and then fed into a reboiler 30 from the lower portion of the reboiler through a reboiler solution feed piping 35. The reboiler 30 is provided with a heat transfer tube (not shown), and the absorbing solution is heated to, for example, 120° C. to 140° C. by passing of a steam 32 through the heat transfer tube. The heated absorbing solution generates vapor and the vapor is fed to the regeneration column 26 through the regeneration column vapor piping 33. The reboiler 30 is provided with a partition plate 56 and a solution, that has overflown the partition plate 56, is stored in the bottom portion of the regeneration column 26 through a regeneration column solution feed piping 57 and extracted by an amine absorbing solution circulation pump 28b. After decreasing the temperature to, for example, about 40° C. by the amine heat exchanger 46, the solution is fed to the absorption column packed bed 40 through the absorption column amine feed piping 41.

It is concerned that the above-mentioned $CO_2$ chemical absorption method by an amine absorbing solution requires enormous heat, like steam, and thus drastically increases running cost. Therefore, there is proposed a method in which an amine absorbing solution fed to an absorption column from a regeneration column is preheated by using, as a unit configured to decrease heat required for a $CO_2$ chemical absorption equipment, heat recovered by a boiler or a heating medium (for example, Patent Documents 3 and 4).

PRIOR ART LIST

Patent Documents

Patent Document 1: WO 2004/023040 A
Patent Document 2: JP 2002-126439 A
Patent Document 3: JP 3486220 B
Patent Document 4: JP 2004-292298 A

SUMMARY OF THE INVENTION

Problems to be Resolved by the Invention

In the above-mentioned $CO_2$ chemical absorption equipment by an amine absorbing solution, there is a problem that enormous heat energy is required for the regeneration of an amine absorbing solution and thus drastically increasing running cost. In order to solve the problem, as mentioned above, there is known a method in which an amine absorbing solution fed to a regeneration column is heated using heat of a boiler exhaust gas or a heating medium. According to findings of the present inventors, it has been found that when an amine absorbing solution extracted from a $CO_2$ absorption column is excessively heated, the amine absorbing solution does not drop down to a lower tank in a regeneration column thereby causing a phenomenon that it becomes difficult to perform circulation, and thus leading to a problem that feed of heat is limited and it becomes impossible to efficiently use heat recovered from a boiler exhaust gas.

An object of the present invention is to provide an exhaust gas treatment system that effectively use heat recovered from an exhaust gas without any limitation in a $CO_2$ chemical absorption equipment that requires enormous heat energy, and thus enabling reduction in running cost of the $CO_2$ chemical absorption equipment.

Means for Solving the Problems

In order to achieve the above object, inventions to be claimed in the present application are as follows.
(1) An exhaust gas treatment system with a $CO_2$ chemical absorption equipment, which is provided with a heat recovery device that recovers exhaust heat from an exhaust gas discharged from a boiler; and a $CO_2$ chemical absorption equipment that absorbs $CO_2$ in the exhaust gas by bringing the exhaust gas into contact with an amine absorbing solution in a carbon dioxide ($CO_2$) absorption column, heats the absorbing solution that have absorbed $CO_2$ thereby releasing $CO_2$ in a $CO_2$ regeneration column, heats the absorbing solution after release of $CO_2$ via a reboiler, and then circulates the absorbing solution into a $CO_2$ absorption column; the exhaust gas treatment system comprising a heat exchange unit that gives heat recovered by the heat recovery device to the absorbing solution that is delivered to the reboiler from the $CO_2$ regeneration column of the $CO_2$ chemical absorption equipment.
(2) The system according to (1), wherein the heat exchange unit comprises a heat exchanger provided in an absorbing solution piping, through which an absorbing solution is delivered from a $CO_2$ regeneration column to a reboiler, and a circulation unit of a heating medium, that communicates between the heat exchanger and a heat recovery device of the boiler.
(3) The system according to (1), wherein an absorbing solution piping is configured to heat-exchange an absorbing solution, that is delivered from the $CO_2$ regeneration column to the reboiler, by the heat recovery device, and then to deliver the absorbing solution to the reboiler, and heat recovered by the heat recovery device is given to the absorbing solution that is delivered from a $CO_2$ regeneration column of the $CO_2$ chemical absorption equipment to the reboiler.

Advantageous Effects of the Invention

According to the present invention, a heat recovery device that recovers heat of an exhaust gas discharged from a boiler is provided, and the heat is fed to a $CO_2$ chemical absorption equipment by an amine absorbing solution and used as a heat source for preheating a regenerating amine absorbing solution to be fed to the reboiler from a regeneration column, thereby raising the temperature of the regenerating amine absorbing solution, and thus enabling a decrease in amount of steam to be fed to the reboiler. Since the above heat source is not used for heating an amine absorbing solution extracted from a $CO_2$ absorption column, such a problem does not arise: the absorbing solution does not drop in a regeneration column and thus it becomes difficult to circulate the solution. Since the reboiler requires energy that is remarkably more than heat energy recovered from the exhaust gas, limitation on feed of recovered heat for preheating does not arise. Thereby, it becomes possible to configure an exhaust gas treatment system with higher heat efficiency as compared with the prior art.

EMBODIMENTS FOR CARRYING OUT THE INVENTION

Embodiments of the present invention will be described based on Examples shown in the accompanying drawings. In the respective Examples, a smoke exhaust treatment system comprising a denitration device 2, an air preheater 3, a precipitator 5, an induced draft fan 6, a wet-type desulfurization device 7 and a blower 8 is shown. However, all these devices and arrangements are not necessarily indispensable, and addition and deletion of the fan and blower may be made on an exhaust gas passage, or some devices may comprise a system to be by-passed. There is also no particular limitation on type of the device and the wet-type desulfurization device may be replaced by other type of devices, for example a dry-type desulfurization device and the like.

EXAMPLES

Figure 1:
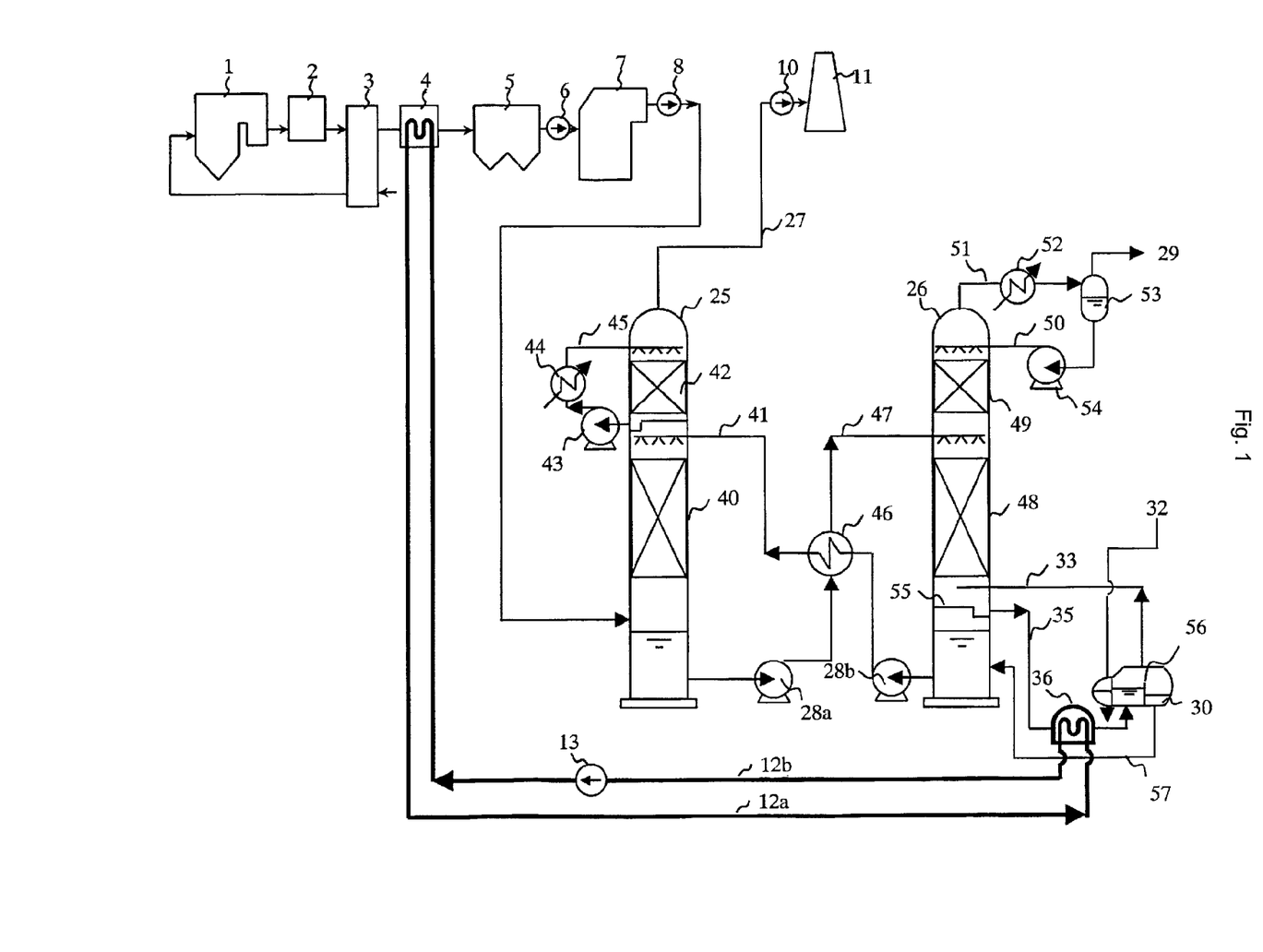
FIG. 1 is an explanatory drawing of an exhaust gas treatment system provided with a $CO_2$ chemical absorption equipment according to Example of the present invention.

FIG. 1 is an explanatory drawing showing an Example of an exhaust gas treatment system of the present invention. The exhaust gas treatment system of the present invention and conventional systems shown in FIGS. 4 and 5 are different in that a solution feed piping 35 of a reboiler 30 is provided with a heating medium heater 36, and a heating medium circulation line (high temperature side) 12a and a heating medium circulation line (low temperature side) 12b, that configure the heat transfer tube through which a heating medium passes, and a heating medium circulation pump 13 are provided between a heat recovery device 4 at an outlet of an air preheater 3 of a boiler 1 and the above-mentioned heating medium heater 36, thereby circulating the heating medium between the heat recovery device 4 and the heating medium heater 36 via the heat transfer tube. As a matter of course, it is possible to control the temperature of a solution to be fed to a reboiler or the temperature of the reboiler by providing the above heating medium circulation line with a flow rate control valve, and controlling the flow rate of a heating medium that passes through the circulation line.

In such a system, an exhaust gas from a boiler 1 is introduced into a denitration device 2 and, after removing nitrogen oxide, combustion air to be used in the boiler 1 is heated by the exhaust gas in an air preheater 3. Next, the exhaust gas discharged from the air preheater 3 is introduced into a heat recovery device 4 and heat is recovered by a heating medium circulating in the heat recovery device, and thus the exhaust gas is cooled. Soot dust in the exhaust gas discharged from the heat recovery device 4 are precipitated by a precipitator 5, and the exhaust gas discharged from the precipitator 5 are introduced into a wet-type desulfurization device 7 after raising the pressure by an induced draft fan 6. Sulfur oxide is removed by the wet-type desulfurization device 7 and the exhaust gas is delivered to a $CO_2$ chemical absorption equipment after raising the pressure by a blower 8. Namely, the exhaust gas having a pressure raised by the blower 8 is introduced into the lower portion of an absorption column 25 of the $CO_2$ chemical absorption equipment. After removing $CO_2$ by contact with an amine absorbing solution to be fed through the upper absorption column amine feed piping in an absorption column packed bed 40, the exhaust gas is washed with wash water to be fed through a wash water circulation line 45 in an absorption column water washing portion 42 and, furthermore, mist of the absorbing solution accompanied with the gas is removed and the gas is discharged as a $CO_2$-removed gas 27 through a funnel 11 by a fan 10. In the absorption column water washing portion 42, wash water is circulated by an absorption column water washing pump 43. On the other hand, the amine absorbing solution containing $CO_2$ absorbed therein is stored in the bottom portion of an absorption column 25, introduced into an amine heat exchanger 46 by an absorbing solution circulation pump 28a, heated, for example, from 40° C. to 100° C., and then introduced into a regeneration column 26 through a regeneration column amine feed piping 47. In the regeneration column 26, a $CO_2$-rich amine absorbing solution to be fed through the regeneration column amine feed piping 47 is fed to the regeneration column packed bed 48. On the other hand, vapor is fed to the lower portion of the packed bed 48 from a reboiler 30 through a regeneration column vapor feed piping 33. In the regeneration column packed bed 48, $CO_2$ is eliminated in a gas phase by vapor-liquid contact between the $CO_2$-rich amine absorbing solution and the vapor. Mist of the amine absorbing solution accompanied with the eliminated $CO_2$ gas is removed in an upper regeneration column water washing portion 49. A regeneration column outlet gas 51 is cooled, for example, to 40° C. by a regeneration column cooler 52 and condensed drain water are separated by a drum 53, followed by feeding as wash water of the regeneration column water washing portion 49 by means of a regeneration column wash water pump 54. On the other hand, a $CO_2$-lean absorbing solution, from which $CO_2$ has been eliminated, is once stored in a tray 55 of the regeneration column lower portion, and then fed into a reboiler 30 from the lower portion of the reboiler 30 through a reboiler solution feed piping 35. The reboiler 30 is provided with a heat transfer tube (not shown), and the absorbing solution is heated to, for example, 120° C. to 140° C. by passing of a steam 32 through the heat transfer tube. The heated absorbing solution generates vapor and the vapor is fed to the regeneration column through the regeneration column vapor piping 33. The reboiler 30 is provided with a partition plate 56 and a solution that has overflown the partition plate is stored in the bottom portion of the regeneration column 26 through a regeneration column solution feed piping 57 and extracted by an amine absorbing solution circulation pump 28b. After decreasing the temperature to, for example, about 40° C. by the amine heat exchanger 46, the solution is fed to the absorption column packed bed 40 through the absorption column amine feed piping 41.

In the present Example, a heating medium is circulated between a heating medium heater 36 provided in a reboiler solution feed piping 35 and a heat recovery device 4 through heating medium circulation lines 12a, 12b by a heating medium circulation pump 13, and a regenerated amine solution passing through the reboiler solution feed piping 35 is heated by a heating medium having a temperature raised due to heat-changing by a heat recovery device 4. In this way, it becomes possible to reduce the amount of steam required to the reboiler 30 by preheating the regenerated amine absorbing solution to be fed to the reboiler 30 using a heating medium that has recovered heat of the heat recovery device 4, and thus enabling a reduction in running cost.

Figure 2:
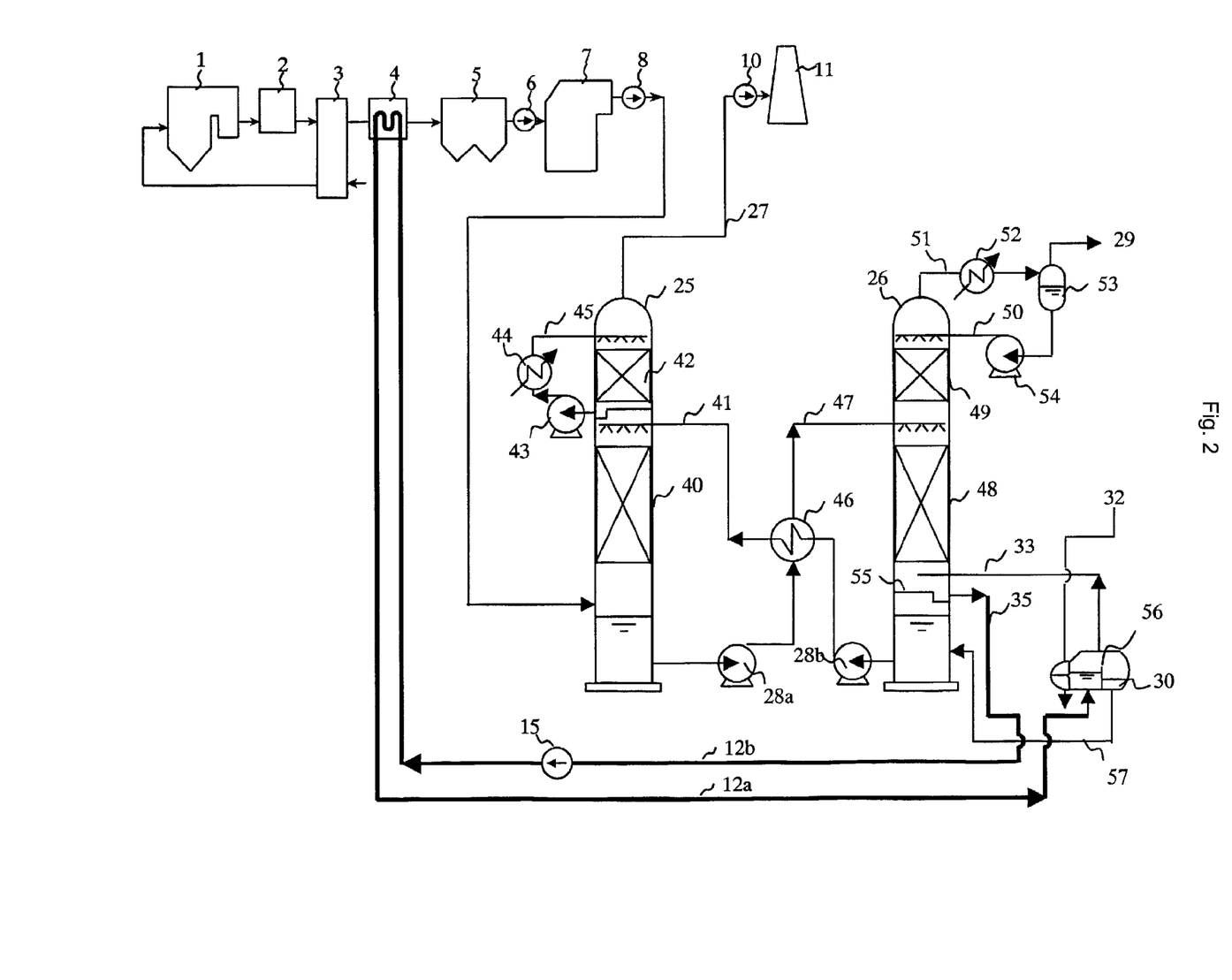
FIG. 2 is an explanatory drawing of an exhaust gas treatment system provided with a $CO_2$ chemical absorption equipment according to another Example of the present invention.

Another Example of the present invention is shown in FIG. 2. A basic configuration of FIG. 2 is the same as that of FIG. 1, except for the following configuration of FIG. 2 in which an absorbing solution stored in a tray 55 provided at the lower portion of a regeneration column 26 is delivered to a heat recovery device 4 that recovers heat by an exhaust gas from a boiler 1 by a regenerating amine absorbing solution circulation pump 15 provided in a heating medium circulation line (low temperature side) 12b, and the absorbing solution heated to high temperature by heat recovery is delivered to a reboiler 30 through a heating medium circulation line 12a. According to the present Example, it is possible to decrease the amount of steam required to the reboiler 30 by directly preheating a regenerated amine absorbing solution to be fed to the reboiler 30 using heat of the heat recovery device 4, and thus enabling a reduction in running cost. Installation cost of the device can also be reduced since it is unnecessary to provide a heating medium heater 36 in FIG. 1.

Comparative Example

Figure 3:
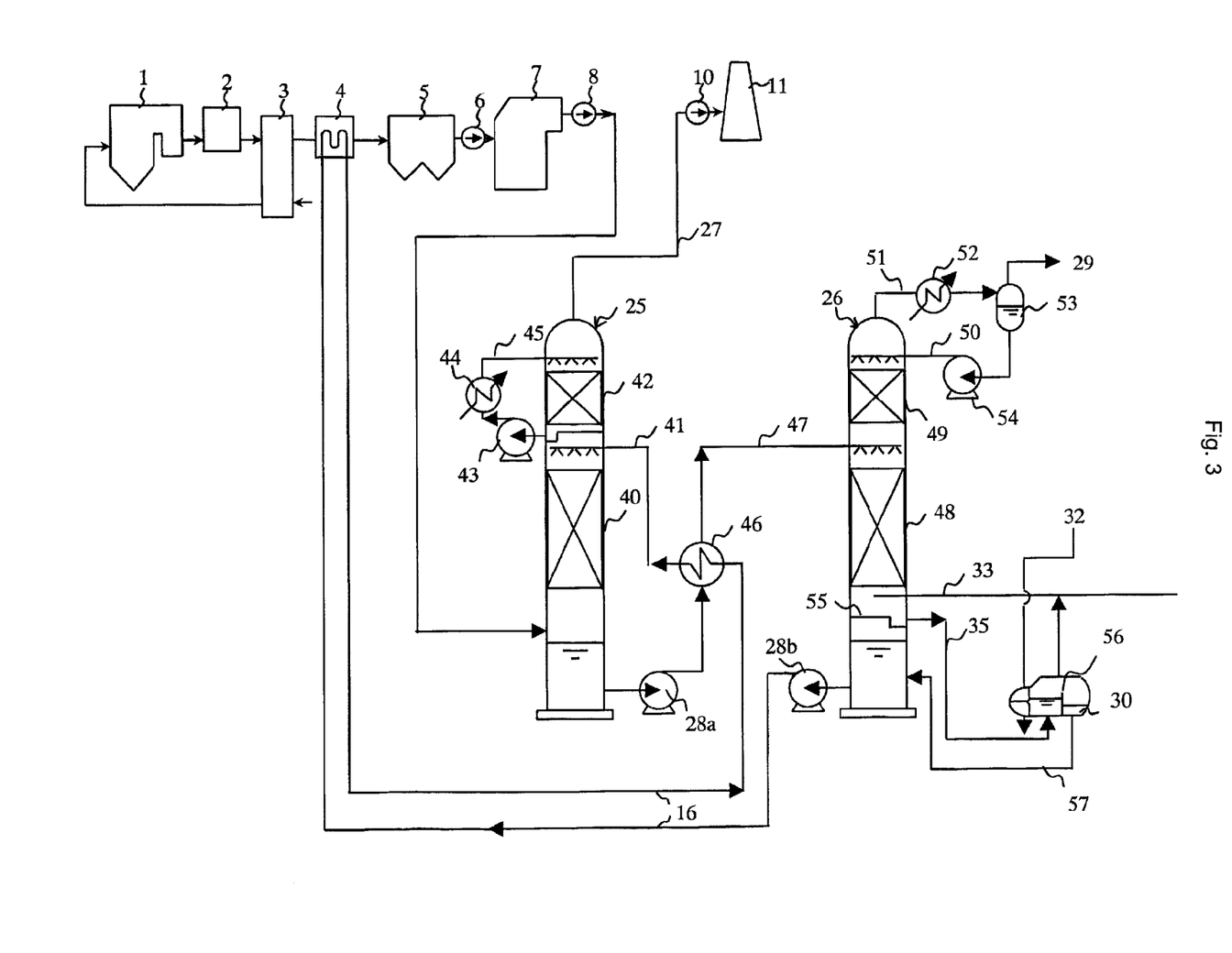
FIG. 3 is an explanatory drawing of an exhaust gas treatment system provided with a $CO_2$ chemical absorption equipment according to Comparative Example of the present invention.

Comparative Example to Examples shown in FIGS. 1 and 2 is shown in FIG. 3. A basic configuration of the system of FIG. 3 is the same as those of FIG. 1 and FIG. 2, except for the following configuration of FIG. 3 in which an amine absorbing solution extracted from the bottom of a regeneration column 26 is delivered to an amine solution heat exchanger 46 by a circulation pump 28b after passing through a heat recovery device 4 that recovers heat by an exhaust gas from a boiler 1, and thus the amine absorbing solution to be fed to an absorption column 25 is preheated.

With this configuration, when an amine absorbing solution to be fed to an absorption column 25 from a regeneration column 26 is excessively heated, the amine absorbing solution to be fed to the regeneration column 26 from the absorption column 25 that performs heat exchange by this amine absorbing solution cannot be maintained at a suitable temperature between about 90° C. and about 100° C. and the high-temperature amine absorbing solution fed to the regeneration column 26 does not drop down to a lower tank thereby causing a phenomenon that it becomes difficult to perform circulation. Therefore, it is necessary to limit preheating of the amine absorbing solution in a heat recovery device 4 and thus causing a disadvantage that heat from a boiler exhaust gas cannot be efficiently used.

However, in Examples of FIG. 1 and FIG. 2 of the present invention, since a regenerated amine absorbing solution to be fed to a reboiler 30 from a regeneration column 26 is preheated, an adverse influence is not exerted on the temperature of the amine absorbing solution to be fed to the regeneration column 26. Therefore, it is not necessary to limit preheating of the amine absorbing solution in a heat recovery device 4 and thus heat from a boiler exhaust gas can be efficiently used.

According to the present invention, since it becomes possible to efficiently use heat recovered from an exhaust gas in a $CO_2$ recovering equipment and system, enormous heat energy required to recover $CO_2$ can be decreased, and thus enables a reduction in running cost.

EXPLANATION OF SYMBOLS

1: Boiler
2: Denitration device
3: Air preheater
4: Heat recovery device
5: Precipitator
6: Induced draft fan
7: Wet-type desulfurization device
12a: Heating medium circulation line (high temperature side)
12b: Heating medium circulation line (low temperature side)
15: Regenerating amine absorbing solution circulation pump
25: Absorption column
26: Regeneration column
30: Reboiler
36: Heating medium heater
46: Amine heat exchanger
57: Regeneration column solution feed piping

The invention claimed is:

1. An exhaust gas treatment system comprising:
a $CO_2$ chemical absorption equipment comprising a $CO_2$ absorption column in which an absorbing solution contacts an exhaust gas discharged from a boiler to absorb $CO_2$ contained in the exhaust gas, and a $CO_2$ regeneration column in which the absorbing solution that has absorbed $CO_2$ is heated to release $CO_2$ from the absorbing solution, and wherein the absorbing solution after release of $CO_2$ is delivered from the $CO_2$ regeneration column to the $CO_2$ absorption column;
a heat recovery device for recovering heat from the exhaust gas;
a heat exchange unit for giving the heat recovered by the heat recovery device to the absorbing solution after release of $CO_2$ is delivered from the $CO_2$ regeneration column; and
a reboiler for heating the absorbing solution delivered from the heat exchange unit.

2. The system according to claim 1, wherein the heat exchange unit comprises a heat exchanger equipped in a piping from the $CO_2$ regeneration column to the reboiler and a circulation unit of a heating medium that communicates between the heat exchanger and the heat recovery device.

3. The system according to claim 1, wherein the reboiler uses steam for heating.

4. The system according to claim 1, wherein the reboiler comprises a heat-transfer tube wherein steam passes through the heat-transfer tube.

5. The system according to claim 1, wherein the absorbing solution comprises an amine.

6. An exhaust gas treatment system comprising:
a $CO_2$ chemical absorption equipment comprising a $CO_2$ absorption column in which an absorbing solution contacts an exhaust gas discharged from a boiler to absorb $CO_2$ contained in the exhaust gas, and a $CO_2$ regeneration column in which the absorbing solution that has absorbed $CO_2$ is heated to release $CO_2$ from the absorbing solution, and wherein the absorbing solution after release of $CO_2$ is delivered from the $CO_2$ regeneration column to the $CO_2$ absorption column;
a heat recovery device for recovering heat from the exhaust gas and giving the recovered heat to the absorbing solution after release of $CO_2$, wherein the absorbing solution after release of $CO_2$ is delivered from the $CO_2$ regeneration column; and
a reboiler for heating the absorbing solution delivered from the heat recovery device.

7. The system according to claim 6, wherein the reboiler uses steam for heating.

8. The system according to claim 6, wherein the reboiler comprises a heat-transfer tube and wherein steam passes through the heat-transfer tube.

9. The system according to claim 6, wherein the absorbing solution comprises an amine.

* * * * *